United States Patent
Tripathi et al.

(10) Patent No.: US 11,200,412 B2
(45) Date of Patent: Dec. 14, 2021

(54) METHOD AND SYSTEM FOR GENERATING PARSED DOCUMENT FROM DIGITAL DOCUMENT

(71) Applicant: Innoplexus AG, Eschborn (DE)

(72) Inventors: Gaurav Tripathi, Pune (IN); Rohit Kewalramani, Pune (IN); Jijeesh KR, Palakkad (IN); Vatsal Agarwal, Rampur (IN)

(73) Assignee: Innoplexus AG, Eschborn (DE)

(*) Notice: Subject to any disclaimer, the term of this patent is extended or adjusted under 35 U.S.C. 154(b) by 243 days.

(21) Appl. No.: 15/855,995

(22) Filed: Dec. 27, 2017

(65) Prior Publication Data
US 2019/0005322 A1 Jan. 3, 2019

Related U.S. Application Data

(60) Provisional application No. 62/446,410, filed on Jan. 14, 2017.

(51) Int. Cl.
*G06K 9/00* (2006.01)
*G06F 40/151* (2020.01)
(Continued)

(52) U.S. Cl.
CPC ....... *G06K 9/00449* (2013.01); *G06F 16/313* (2019.01); *G06F 16/93* (2019.01); *G06F 40/151* (2020.01); *G06F 40/205* (2020.01); *G06F 40/258* (2020.01); *G06K 9/00456* (2013.01); *G06K 9/00463* (2013.01); *G06K 9/36* (2013.01); *G06K 9/6269* (2013.01); *G06K 2209/01* (2013.01)

(58) Field of Classification Search
CPC .......................... G06F 40/15; G06K 9/00449
USPC ......................................................... 707/665
See application file for complete search history.

(56) References Cited

U.S. PATENT DOCUMENTS 5,369,714 A * 11/1994 Withgott ................. G06K 9/72
  382/177
2002/0118379 A1* 8/2002 Chakraborty ....... G06F 17/2241
  358/1.9

(Continued)

OTHER PUBLICATIONS

Hadjar et al, "Xed: a new tool for extracting hidden structures from electronic documents" Document Image Analysis for Libraries, pp. 212-224, XP010681130, DOI: 10.1109/DIAL.2004.1263250, ISBN: 978-0-7695-2088-9, Jan. 23, 2004, 13 pages.

(Continued)

*Primary Examiner* — Syling Yen
(74) *Attorney, Agent, or Firm* — Ziegler IP Law Group, LLC

(57) ABSTRACT

A method and system for generating a parsed document from a digital document. The method includes segmenting the digital document into at least one section; classifying the at least one section of the digital document into at least one of a class: text class, table class, figure class, noise class; identifying a reading order of the digital document; and processing each of the at least one section of the digital document. Furthermore, processing each of the at least one section of the digital document comprises extracting content from each of the at least one section based on the class; and structuring the extracted content based on the reading order to generate the parsed document.

9 Claims, 2 Drawing Sheets

(51) Int. Cl.
*G06F 40/205* (2020.01)
*G06F 40/258* (2020.01)
*G06F 16/93* (2019.01)
*G06F 16/31* (2019.01)
G06K 9/62 (2006.01)
G06K 9/36 (2006.01)

(56) References Cited

U.S. PATENT DOCUMENTS

| | | | |
|---|---|---|---|
| 2011/0209046 A1* | 8/2011 | Huang | G06F 16/9577 |
| | | | 715/234 |
| 2013/0205202 A1* | 8/2013 | Xiao | G06F 40/151 |
| | | | 715/249 |
| 2015/0033116 A1 | 1/2015 | McKinney et al. | |
| 2016/0124916 A1* | 5/2016 | Song | G06F 9/5027 |
| | | | 715/242 |

OTHER PUBLICATIONS

Yucun Pan et al, "Document layout analysis and reading order determination for a reading robot" TENCON 2010, IEEE Region 10 Conference, XP031898213, DOI: 10.1109/TENCON.2010.5686038, ISBN: 978-1-4244-6889-8, Nov. 21, 2010, 1 page.

European Patent Office, Extended European search report, Application No. 18020017.2, dated Jun. 6, 2018, 9 pages.

* cited by examiner

METHOD AND SYSTEM FOR GENERATING PARSED DOCUMENT FROM DIGITAL DOCUMENT

CROSS REFERENCE TO RELATED APPLICATIONS

This application claims priority to U.S. Provisional Patent Application No. 62/446,410, filed Jan. 14, 2017, which is hereby incorporated by reference in its entirety.

TECHNICAL FIELD

The present disclosure relates generally to data processing; and more specifically, to methods of generating a parsed document from a digital document. Furthermore, the present disclosure also relates to systems of generating a parsed document from a digital document. Moreover, the present disclosure also relates to computer readable medium containing program instructions for execution on a computer system, which when executed by a computer, cause the computer to perform method steps for generating a parsed document from a digital document.

BACKGROUND

With advancements in technology, digital data has become a primary source of information and content. Furthermore, digital data is stored in a digital document. The digital document contains data in form of tables, images, text and so forth. Additionally, data stored in the digital document needs to be extracted in order to obtain user-specific content.

Generally, data extraction tools are employed for extraction of data from the digital document. Furthermore, the conventional data extraction tools provide a user interface that is used to provide the digital document thereto. The user has to manually select data to be extracted from the digital document. Specifically, user may have to specifically point and select area containing text to be extracted. Additionally, the conventional data extraction techniques use a parser in order to analyze contents of the digital document. Moreover, the conventional data extraction techniques use Optical Character Recognition (OCR) technique for identifying contents of the Digital document.

However, the conventional data extraction techniques require a lot of human intervention. Consequently, the conventional data extraction techniques are semiautomatic. Furthermore, the conventional data extraction techniques are specific to a particular type of data such as table, text, image and so forth. Therefore, the conventional data extraction techniques are inefficient and do not exhibit a generalized approach. Moreover, the conventional data extraction techniques do not retain original structure of the digital document once extraction of data has been carried out. Furthermore, the conventional data extraction techniques are limited to consistent and small datasets.

Therefore, in light of the foregoing discussion, there exists a need to overcome the aforementioned drawbacks associated with the conventional methods of data extraction from a digital document.

SUMMARY

The present disclosure seeks to provide a method of generating a parsed document from a digital document. The present disclosure also seeks to provide a system for generating a parsed document from a digital document. The present disclosure seeks to provide a solution to the existing problem of unstructured data extraction from digital documents. An aim of the present disclosure is to provide a solution that overcomes at least partially the problems encountered in the prior art, and provides a reliable and easy to implement method for extraction of data from a digital document.

In one aspect, an embodiment of the present disclosure provides a method of generating a parsed document from a digital document, wherein the method comprises:
  segmenting the digital document into at least one section;
  classifying the at least one section of the digital document into at least one of a class: text class, table class, figure class, noise class;
  identifying a reading order of the digital document; and
  processing each of the at least one section of the digital document, wherein the processing comprises:
    extracting content from each of the at least one section based on the class; and
    structuring the extracted content based on the reading order to generate the parsed document.

In another aspect, an embodiment of the present disclosure provides a system for generating a parsed document from a digital document, wherein the system comprises:
  a database arrangement operable to store the digital document; and
  a processing arrangement operable to:
    segment the digital document into at least one section;
    classify at least one section of the digital document into at least one of a class: text class, table class, figure class, noise class;
    identifying a reading order of the digital document; and
    process each of the at least one section of the digital document, wherein the processing comprises:
      extracting content from each of the at least one section based on the class; and
      structuring the extracted content based on the reading order to generate the parsed document.

In yet another aspect, an embodiment of the present disclosure provides a computer readable medium containing program instructions for execution on a computer system, which when executed by a computer, cause the computer to perform method steps for generating a parsed document from a digital document, the method comprising the steps of:
  segmenting the digital document into at least one section;
  classifying the at least one section of the digital document into at least one of a class: text class, table class, figure class, noise class;
  identifying a reading order of the digital document; and
  processing each of the at least one section of the digital document, wherein the processing comprises:
    extracting content from each of the at least one section based on the class; and
    structuring the extracted content based on the reading order to generate the parsed document.

Embodiments of the present disclosure substantially eliminate or at least partially address the aforementioned problems in the prior art, and enables an optimal, organized and unambiguous extraction of data from the digital document.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
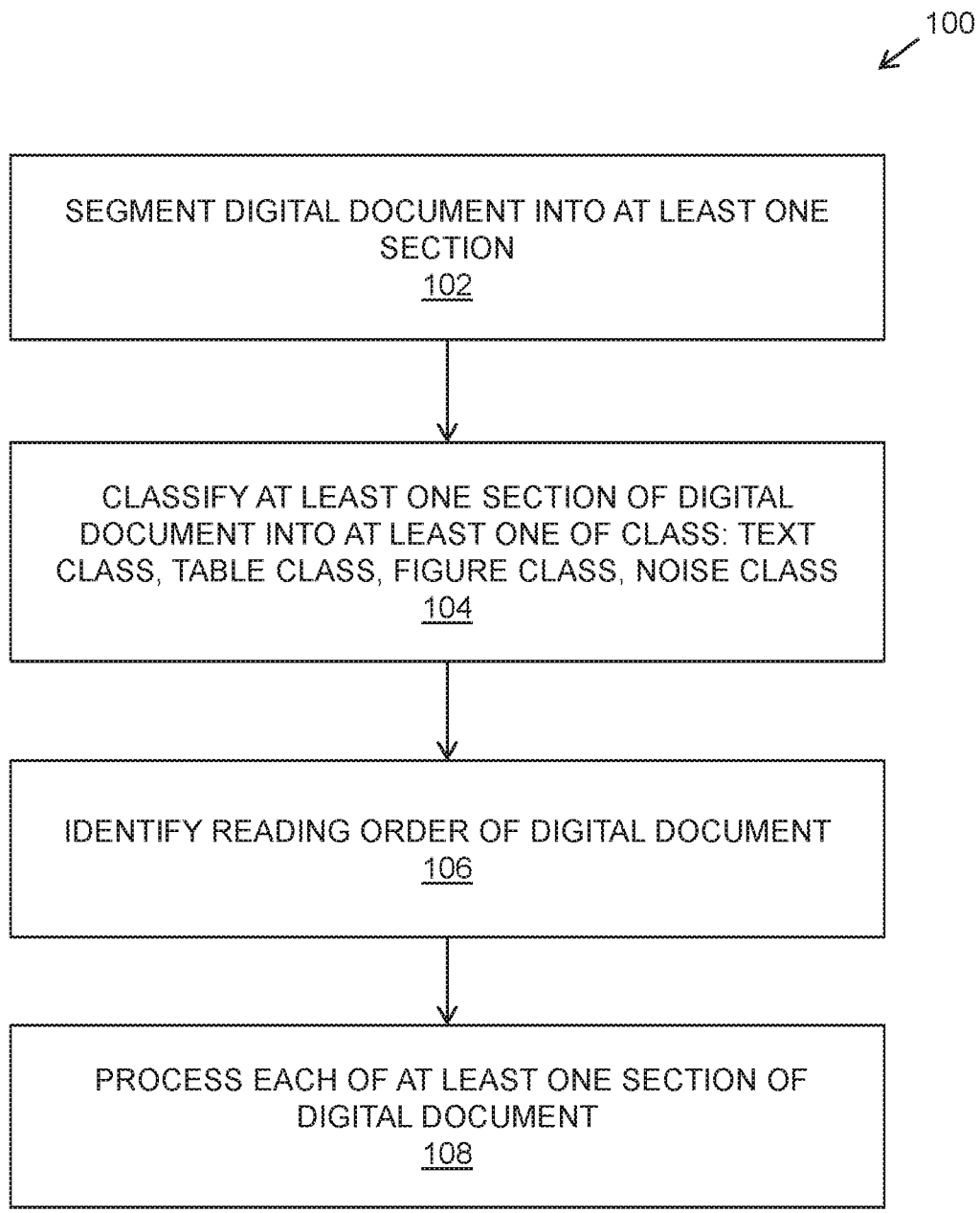
FIG. 1 is an illustration of steps of a method of generating a parsed document from a digital document, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, a method of generating a parsed document from a digital document, wherein the method comprises:
  segmenting the digital document into at least one section;
  classifying the at least one section of the digital document into at least one of a class: text class, table class, figure class, noise class;
  identifying a reading order of the digital document; and
  processing each of the at least one section of the digital document, wherein the processing comprises:
    extracting content from each of the at least one section based on the class; and
    structuring the extracted content based on the reading order to generate the parsed document.

In another aspect, a system for generating a parsed document from a digital document, wherein the system comprises:
  a database arrangement operable to store the digital document; and
  a processing arrangement operable to:
    segment the digital document into at least one section;
    classify at least one section of the digital document into at least one of a class: text class, table class, figure class, noise class;
    identifying a reading order of the digital document; and
    process each of the at least one section of the digital document, wherein the processing comprises:
      extracting content from each of the at least one section based on the class; and
      structuring the extracted content based on the reading order to generate the parsed document.

The present disclosure provides the aforementioned method for generating a parsed document from a digital document and the aforementioned system for generating the parsed document from the digital document. The described method allows for extraction of data from the digital document without any human intervention. Furthermore, the method presented herein is a generalized approach and efficient to handle any type of data provided thereto. Moreover, the method can handle large datasets and retains original structure of the digital document in extracted data. Additionally, the method disclosed herein provides an optimal and inexpensive approach for extraction of information from the digital document.

Throughout the present disclosure, the term "digital document" relates to a digital file (namely, page, data structure and so forth) that contains data in form of table, text, image, symbol, graph, map, hyperlink to a data location and/or a combination thereof. Furthermore, the digital document may be in any file format such as PDF, MS-WORD, JPG, XML and so forth. Additionally, the digital document may be structured or unstructured. Moreover, the digital document is stored in a database arrangement.

Throughout the invention, the term "database arrangement" relates to an organized body of digital data regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement may include to the software program for creating and managing one or more databases. Optionally, the database arrangement may be operable to support relational operations, regardless of whether it enforces strict adherence to the relational model, as understood by those of ordinary skill in the art. Additionally, the database arrangement may be populated by digital data (namely, data elements). Furthermore, the database arrangement is operable to store the digital document. Moreover, the database arrangement is further operable to store the parsed document.

Throughout the present disclosure, the term "parsed document" relates to a digital file (namely, page, data structure and so forth) that contains data extracted from the digital document. Furthermore, the parsed document is organized based on contents of the digital document from which the parsed document may be extracted. Moreover, the parsed document can be in any file format such as a text document, MS-WORD document and so forth. Additionally, the parsed document may include information in form of table, text, image, symbol graphs, maps, hyperlink to a data location and/or a combination thereof. The information in the parsed document is organized retaining structure of the digital document the parsed document was extracted from. Moreover, a processing arrangement is operable to access the digital document and the parsed document stored in the database arrangement.

Furthermore, the processing arrangement is operable to extract content from the digital document. Throughout the present disclosure, the term "processing arrangement" relates to a computational element that is operable to process and extract digital data stored in the digital document in order to generate a parsed document. Optionally, the processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing arrangement" may refer to one or more individual processors, processing devices and various elements associated with a processing device that may be shared by other processing devices. Additionally, the one or more individual processors, processing devices and elements are arranged in various architectures for responding to and processing the instructions that drive the system. Furthermore, the processing arrangement is coupled to a communication module in order to retrieve the digital document and store the parsed document stored in a database arrangement.

Throughout the present disclosure, the term "communication module" relates to an arrangement of interconnected programmable and/or non-programmable components that are configured to facilitate data communication between one or more electronic devices and/or databases, whether available or known at the time of filing or as later developed. Furthermore, the communication module may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Furthermore, the communication module is associated with the database arrangement.

In a first example, the digital document may be a portable document format (PDF) document including data regarding environmental changes in Antarctica for a span of 10 years. Furthermore, the PDF document may include data regarding temperature, water level and so forth in a tabular form. Additionally, the PDF document may include graphs for change in temperature over the 10 years. Moreover, the PDF document may also include figures for melting of glaciers. Furthermore, the digital document can have data segregated by paragraphs, multiple columns, tabular content, images such as pie charts along with their legends, histograms and so forth.

Moreover, the data in the digital document may be analyzed and extracted in order to generate the parsed document. Referring to the first example, the PDF may be analyzed and extracted in order to generate a parsed document containing information included in the PDF.

As mentioned previously, the method for generating the parsed document from the digital document comprises: segmenting the digital document into at least one section. Specifically, the system for generating the parsed document from the digital document comprises the processing arrangement operable to segment the digital document into the at least one section. Furthermore, segmentation of the at least one section is based on layout of content in the digital document. Specifically, each part of the digital document that aligns together forms a section. The at least one section may be a table, an image, a paragraph, a row, a column and so forth. Furthermore, segmenting the digital document includes analysing structure of the digital document. Moreover, structure of the digital document pertains to positioning and location of the content in the digital document.

Optionally, the at least one section may be separated by white space in between. The at least one section may be a connected portion of the digital document and may be treated as continuous dark area for the purpose of segmentation. Furthermore, the at least one section may also be segmented based on contextual meaning thereof. Additionally optionally, the digital document is parsed and analyzed in order to determine the at least one section of the digital document. Furthermore, segmentation of the at least one or more section may be performed by applying a morphological operation. Specifically, dilation may be applied over content of the digital document in order to segment the digital document into the at least one section. Additionally, dilation uses a structuring element for probing and expanding contents of the digital document provided thereto as an input. Furthermore, portion of the digital document including text, figure, table and so forth may be blackened. Subsequently, whitespace may signify end of a previous at least one section and/or start of a next at least one section.

Referring to the first example, text in one paragraph may be treated as one section, a figure of melting glacier may be treated as another section, a graph of increase in temperature in every consecutive year may be considered as one section and so forth. Furthermore, dilation may be applied in order to perform segmentation and identify one or more sections. Specifically, text in the one paragraph, the figure, and the graph may be blackened. Subsequently, whitespace between the one paragraph, the figure, and the graph may be analyzed in order to identify end of the one paragraph and/or start of the graph or the table.

Optionally, the method of generating the parsed document from the digital document comprises determining an importance factor for each of the at least one section of the digital document. Specifically, the processing arrangement is further operable to determine the importance factor for each of the at least one section of the digital document. Furthermore, the importance factor is operable to define a notion of relevance (namely, importance) to each of the at least one section of the digital document. Specifically, a higher value of importance factor is indicative of a higher relevance of the at least one section of the digital document. Consequently, a more relevant at least one section will have a high importance factor and a less relevant at least one section will have a low importance factor. Specifically, unimportant data such as line numbers, page numbers and so forth included in the at least one section may have a least value of the importance factor. Optionally, the importance factor may be a number, a letter, a phrase, an alphanumeric element, a symbol, identifier and so forth.

As mentioned previously, the method of generating the parsed document from the digital document comprises: classifying the at least one section of the digital document into at least one of a class: text class, table class, figure class, noise class. Specifically, the processing arrangement is operable to classify at least one section of the digital document into at least one of a class: text class, table class, figure class, noise class. Furthermore, the classification of the at least one section of the digital document involves analysing the at least one section of the digital document. Furthermore, the text class includes digital data written in machine or human understandable language. Moreover, the table class includes data written inside a tabular structure. Additionally, the contents of the table may be text, symbol, identifier, image, graph and so forth. Furthermore, the figure class includes data in form of a map, a symbol, a graph, an image and so forth. Moreover, the noise class includes data that is not relevant to the context of the digital document such as an advertisement pertaining to a book. Beneficially, classification of the at least one section of the digital document identifies organization (namely, structure) of contents of the digital document. The identified organization of the digital document further affects the method. In an example, support vector machine (SVM) may be used to classify contents of the digital document.

Optionally, classification may be done based on the importance factor associated with the at least one section of the digital document. Additionally, the importance factor for the at least one section of the digital document may be predetermined. Alternatively, the importance factor for the at least one section of the digital document may be determined during processing thereof based on contextual meaning thereof.

Referring to the first example, the table pertaining to various temporal changes in the region may be included in a table class; the figure of melting glaciers may be included in a figure class; text included in the PDF may be included in a text class, the page numbers, section numbers and line numbers may be included in the noise class.

As mentioned previously, the method of generating a parsed document from a digital document comprises: identifying a reading order of the digital document. Specifically, the processing arrangement is operable to identify a reading order of the digital document. Furthermore, the reading order refers to a reading sequence in which the digital document is to be extracted. Specifically, the reading order of the digital document is based on association of contents in the digital document. Moreover, the reading order is identified based on layout of page in the digital document that needs to be extracted such as content in a first column will be read prior to the content in the second column in the page. Optionally, the reading order may be identified based on context of the content in the page. Specifically, the content with a similar contextual meaning may have a sequential reading order in case there is need to read them one after another.

Referring to the first example, a sentence that continues before and after a figure may be read in a sequential order. Furthermore, text divided in two columns may be read in a sequence of one after another.

Optionally, the identification of the reading order of the digital document comprises: identifying layout of at least one section of the digital document. Furthermore, the layout of the at least one section of the digital document may be identified by parsing and/or analyzing the at least one section of the digital document. Additionally, parsing refers to analyzing each element (namely, token) of the digital document. Moreover, the layout of the at least one section of the digital document may include number of columns, number of rows, horizontal and vertical separators, white space between one or more sections of the digital document, whitespace between columns, coordinate information, location of figure, location of table and so forth.

Beneficially, determining the layout of the at least one section of the digital document may further assist in an optimized segmentation of the digital document into at least one section.

Optionally, the identification of the reading order of the digital document comprises: determining a sequential order of the at least one section based on the layout. Furthermore, the determined layout provides information regarding flow of information in the digital document. In such an example, when a part of a sentence may be flowing from one of the at least one section to other one of the at least one section may be read in a sequential order. In another example, an incomplete sentence positioned before and after a figure may be used to determine the reading order of the at least one section of the digital document.

As mentioned previously, the method of generating a parsed document from a digital document comprises: processing each of the at least one section of the digital document. Specifically, the processing arrangement is operable to process each of the at least one section of the digital document. Furthermore, processing comprises extracting contents from the digital document. Consequently, processing generates extracted content. Additionally, processing further organizes the extracted content in order to generate an easily understandable form of the extracted content.

Furthermore, the processing comprises: extracting content from each of the at least one section based on the class. Moreover, extraction is performed utilizing word level and sentence level features of the digital document. Additionally, parameters such as font type, font width, number of words in a sentence or a line, arrangements of characters in a word and so forth are taken into consideration for extraction of contents from the digital document. Consequently, the parameters taken into consideration determine contextual and structural nature of sequence of words exhibiting such parameters. Furthermore, extraction of contents from each of the at least one section involves different steps for different class of the at least one content.

Optionally, extraction may be performed by an extraction module. Furthermore, the extraction module may be hardware, software, firmware or a combination thereof. Additionally, the extraction module may be operatively as well as communicably coupled to the processing module. Moreover, the extraction module may take a classified the at least one section of the digital document as input. Subsequently, the extraction module may generate the extracted content for the at least one section of the digital document.

Optionally, extracting content from each of at least one section having a text class comprises: identifying one or more text blocks and text block features from the at least one section having text class. Specifically, the processing arrangement further includes a text extraction module operable to extract content from each of at least one section having the text class by identifying one or more text blocks and text block features from the at least one section having text class. Moreover, text blocks may be one or more continuous area of the digital document including data in textual form. Additionally, text blocks may not have whitespace therebetween. Specifically, text blocks may be a one or more continuous set of sentences in a single paragraph, row, column and/or so forth. Specifically, the text blocks may exhibit features regarding organization (namely, orientation) thereof. Additionally, the text block features may include paragraphs, headers, footers, key notes, columns, rows and so forth. Furthermore, the text block features may be identified by applying image processing and text mining approach. Beneficially, the identification of the one or more text blocks and text block features minimizes errors in word spellings, sentence structure and so forth.

Optionally, extracting content from each of at least one section having a text class further comprises: extracting text and text features from the one or more text blocks using optical character recognition techniques. Specifically, the processing arrangement further includes a text extraction module operable to extract content from each of at least one section having a text class by extracting text and text features from the one or more text blocks using optical character recognition techniques. Furthermore, the optical character recognition (OCR) techniques may convert handwritten or printed text into machine-encoded text. Furthermore, OCR techniques such as optical character recognition (OCR), optical word recognition (OWR), intelligent character recognition (ICR), intelligent word recognition (IWR) and so forth may be applied based upon type of text document to be extracted.

In an example, extraction of text and text features from a page may be performed by converting the text into a binary image. Furthermore, vertical pixel counts may be extracted in order to detect content boundary as well as outer boundary of the page. Moreover, horizontal pixel counts may be extracted in order to separate boundaries of text blocks. Consequently, based on extracted boundary values the text in the page may be segmented and noisy patches in noise class may be eliminated. Furthermore, text content may be extracted by applying recurrent neural network (RNN) that may be able to identify and process sequence of inputs and perform extraction thereof.

Optionally, extracting content from each of at least one section having a figure class comprises: converting the figure in the at least one section to a grayscale format. Specifically, that the processing arrangement further includes a figure extraction module operable to extract content from each of at least one section having the figure class by converting the figure in the at least one section to a grayscale format. Furthermore, the grayscale format of the figure represents value of each pixel in the figure in a single sample representing only an amount (namely, intensity) of light. Additionally, the grayscale format of the figure may have two colors in it namely black and white or monochrome. Additionally, the grayscale format may have shades of gray in between.

Optionally, extracting content from each of at least one section having the figure class further comprises: calculating a histogram of grayscale-formatted figure. Specifically, the figure extraction module is further operable to extract content from each of at least one section having the figure class by calculating the histogram of grayscale-formatted figure. Furthermore, the histogram of the grayscale formatted figure shows the number of pixels in the figure at each different intensity value found in the figure. Beneficially, histogram may be used in order to determine value of threshold to be used when converting a grayscale-formatted image to a binary image by performing a thresholding operation. In an example, the histogram of the figure may have intensity value on x-axis and pixel count on y-axis thereof.

Optionally, extracting content from each of at least one section having the figure class comprises: applying a thresholding operation on the figure based on the calculated histogram. Specifically, the figure extraction module is further operable to apply the thresholding operation on the figure based on the calculated histogram. Furthermore, thresholding operation may be performed on the figure in order to separate out regions of the figure corresponding to specific objects within the figure from the regions of the figure that correspond to background region of the figure. Beneficially, thresholding provides an easy and convenient way to perform separation based on different intensities or colors in foreground and background regions of the figure. In an example, a grayscale-formatted figure may act as an input to the thresholding operation that may generate a binary image as output thereof. Specifically, black pixels may correspond to background and white pixels correspond to foreground of the binary image. Alternatively, white pixels may correspond to background and black pixels correspond to foreground of the binary image.

Optionally, extracting content from each of at least one section having the figure class comprises: detecting boundaries and/or dimensions of the figure. Specifically, the figure extraction module is further operable to detecting boundaries and/or dimensions of the figure. Furthermore, detection of boundaries of the figure may be carried out by applying edge detection methods. Specifically, edge detection methods may identify points in the figure where intensity of light changes sharply (namely, discontinuous). Subsequently, one or more parts of the figure and/or the figure may be cropped in order to extract content from the figure.

As mentioned previously, the method of generating the parsed document from the digital document further comprises: structuring the extracted content based on the reading order to generate the parsed document. Specifically, the processing further comprises: structuring the extracted content based on the reading order to generate the parsed document. Furthermore, structuring of the extracted content is based on features of the content that is to be extracted. Beneficially, structuring the extracted content generates an organized and unambiguous approach in order to comprehend context of the extracted content.

Optionally, structuring the extracted content based on the reading order comprises: labelling one or more text blocks based on the text block features and/or text features. Furthermore, labeling of the extracted content may be done with identifier, symbol, number, letter, phrase, alpha-numeral and so forth. Additionally, the labeling may provide additional information pertaining to organization and context of the text and/or text block.

Optionally, structuring the extracted content based on the reading order further comprises: identifying associations between one or more text blocks and extracted figure and/or extracted table from the at least one section having figure class and/or table class respectively. Furthermore, identification of association between one or more text blocks may be done based on sentences overflowing between one or more text blocks. Additionally, identification of association between one or more text blocks may be also be done based on contextual meaning thereof. Beneficially, identification of such association between one or more text blocks may reduce time involved in understanding and structuring the extracted content.

Optionally, structuring the extracted content based on the reading order further comprises: arranging one or more labelled text blocks, extracted figure and/or extracted table based on the labels, associations and the reading order. Furthermore, the text blocks with identical or similar label thereof may be arranged together. Additionally, text blocks having an association therebetween may be arranged together on a single page, file, data structure and so forth. Moreover, arrangement of the text blocks may also be based on reading order thereof such that the arranged text blocks may be accessed in a sequential order. In an example the arranged text blocks may have special symbols in order to demonstrate an association (namely, contextual) between two or more text blocks. In such an example, the text block may also include links (namely, pointers, reference) to text blocks, table or figure having an association therewith. Consequently, the parsed document is generated comprising extracted content (namely, text, figure, table, maps, graphs and so forth) organized based on different features, reading order and associations thereof.

Furthermore, there is disclosed a computer readable medium containing program instructions for execution on a computer system, which when executed by a computer, cause the computer to perform method steps for generating a parsed document from a digital document, the method comprising the steps of segmenting the digital document into at least one section; classifying the at least one section of the digital document into at least one of a class: text class, table class, figure class, noise class; identifying a reading order of the digital document; and processing each of the at least one section of the digital document. Furthermore, processing each of the at least one section of the digital document comprises extracting content from each of the at least one section based on the class; and structuring the extracted content based on the reading order to generate the parsed document.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method 100 for generating a parsed document from a digital document, in accordance with an embodiment of the present disclosure. At a step 102, the digital document is segmented into at least one section. At a step 104, the at least one section of the digital document is classified into at least one of a class: text class, table class, figure class, noise class. At a step 106, a reading order of the digital document is identified. At a step 108, each of the at least one section of the digital document is processed. Additionally, processing each of the at least one section of the digital document comprises extraction of content from each of the at least one section based on the class. Moreover, processing further comprises structuring the extracted content based on a reading order to generate the parsed document.

Figure 2:
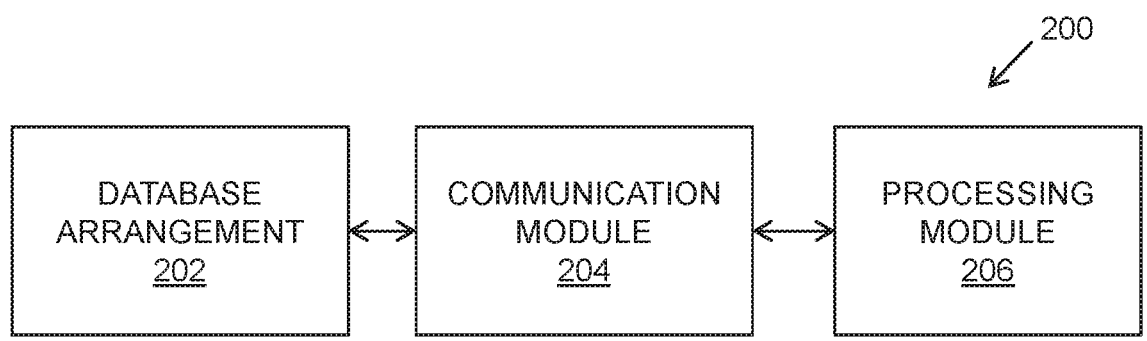
FIG. 2 is a block diagram of a system for generating a parsed document from a digital document, in accordance with an embodiment of the present disclosure.

Referring to FIG. 2, illustrated is a block diagram of a system 200 for generating a parsed document from a digital document, in accordance with an embodiment of the present disclosure. The system 200 comprises a database arrangement 202 operable to store a digital document. Furthermore, the system 200 comprises a communication module 204 operable to retrieve the digital document from the database arrangement 202. The communication module 204 is operatively coupled to the processing module 206. The processing module 206 is operable to generate the parsed document from the digital document. Specifically, the processing module 206 is operable to classify at least one section of the digital document. Furthermore, the processing module 206 is operable to extract content from each of the at least one section based on the class. Additionally, the processing module 206 is also operable to structure the extracted content based on the reading order to generate the parsed document.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of generating a parsed document from a digital document, wherein the method comprises:
    (a) segmenting the digital document into at least one section;
    (b) determining an importance factor for each of the at least one section of the digital document, wherein the importance factor is indicative of relevancy of the at least one section of the digital document;
    (c) classifying the at least one section of the digital document into at least one of a class: text class, table class, figure class, noise class, based on the determined importance factor associated with the at least one section of the digital document;
    (d) identifying a reading order of the digital document; and
    (e) processing each of the at least one section of the digital document, wherein the processing comprises:
        (i) extracting content from each of the at least one section based on the at least one of a class: text class, table class, figure class, noise class to generate at least one of an extracted text, extracted table, extracted figure, extracted noise, wherein extracting content from each of at least one section having a text class comprises identifying one or more text blocks and text block features from the at least one section having text class and extracting text and text features from the one or more text blocks;
        (ii) eliminating extracted noise classified in the noise class from the extracted content;
        (iii) structuring the extracted content, after eliminating the content classified in the noise class, based on the identified reading order, wherein structuring the extracted content based on the reading order comprises:
            (1) labelling one or more text blocks based on the text block features and/or text features;
            (2) identifying associations between one or more text blocks and extracted figure and/or extracted table from the at least one section having figure class and/or table class respectively; and
            (3) arranging one or more labelled text blocks, extracted figure and/or extracted table based on labels, associations and the reading order; and
    (f) generating the parsed document from the digital document based on the structured content.

2. The method of claim 1, wherein the identifying the reading order of the digital document comprises:
    identifying layout of at least one section of the digital document; and
    determining a sequential order of the at least one section based on the layout.

3. The method of claim 1, wherein extracting content from each of at least one section having a text class comprises extracting text and text features from the one or more text blocks using optical character recognition techniques.

4. The method of claim 3, wherein extracting content from each of at least one section having a figure class comprises:
    converting the figure in the at least one section to a grayscale format;
    calculating a histogram of grayscale-formatted figure;
    applying a thresholding operation on the figure based on the calculated histogram; and
    detecting boundaries and/or dimensions of the figure.

5. A system for generating a parsed document from a digital document, wherein the system comprises:
a database arrangement to store the digital document; and
a processing arrangement to:
- (a) segment the digital document into at least one section;
- (b) determine an importance factor for each of the at least one section of the digital document;
- (c) classify at least one section of the digital document into at least one of a class: text class, table class, figure class, noise class, based on the determined importance factor associated with the at least one section of the digital document;
- (d) identify a reading order of the digital document; and
- (e) process each of the at least one section of the digital document, wherein the processing comprises:
  - (i) extracting content from each of the at least one section based on the at least one of a class: text class, table class, figure class, noise class to generate at least one of an: extracted text, extracted table, extracted figure, extracted noise, wherein extracting content from each of at least one section having a text class comprising identifying one or more text blocks and text block features from the at least one section having text class and extracting text and text features from the one or more text blocks;
  - (ii) eliminating extracted noise classified in the noise class from the extracted content;
  - (iii) structuring the extracted content, after eliminating the content classified in noise class based on the identified reading order, wherein structuring the extracted content based on the reading order comprises:
    - (1) labelling one or more text blocks based on the text block features and/or text features;
    - (2) identifying associations between one or more text blocks and extracted figure and/or extracted table from the at least one section having figure class and/or table class respectively; and
    - (3) arranging one or more labelled text blocks, extracted figure and/or extracted table based on the labels, associations and the reading order; and
- (f) generate the parsed document from the digital document based on the structured content.

6. The system of claim 5, wherein the processing arrangement further determines an importance factor for each of the at least one section of the digital document.

7. The system of claim 5, wherein the processing arrangement further includes a text extraction module to extract content from each of at least one section having a text class by
extracting text and text features from the one or more text blocks using optical character recognition techniques.

8. The system of claim 7, wherein the processing arrangement further includes a figure extraction module to extract content from each of at least one section having a figure class by:
- converting the figure in the at least one section to a grayscale format;
- calculating a histogram of grayscale-formatted figure;
- applying a thresholding operation on the figure based on the calculated histogram; and
- detecting boundaries and/or dimensions of the figure.

9. A non-transitory computer readable medium containing program instructions for execution on a computer system, which when executed by a computer, cause the computer to perform method steps for generating a parsed document from a digital document, the method comprising:
- (a) segmenting the digital document into at least one section;
- (b) determining an importance factor for each of the at least one section of the digital document;
- (c) classifying the at least one section of the digital document into at least one of a class: text class, table class, figure class, noise class, based on the determined importance factor associated with the at least one section of the digital document;
- (d) identifying a reading order of the digital document; and
- (e) processing each of the at least one section of the digital document, wherein the processing comprises:
  - (i) extracting content from each of the classified at least one section based on the at least one of a class: text class, table class, figure class, noise class to generate at least one of an: extracted text, extracted table, extracted figure, extracted noise, wherein extracting content from each of at least one section having a text class comprises identifying one or more text blocks and text block features from the at least one section having text class and extracting text and text features from the one or more text blocks;
  - (ii) eliminating extracted noise classified in the noise class from the extracted content; and
  - (iii) structuring the extracted content, after eliminating the content classified in the noise class, based on the identified reading order, wherein structuring the extracted based on the reading order comprises:
    - (1) labelling one or more text blocks based on the text block features and/or text features;
    - (2) identifying associations between one or more text blocks and extracted figure and/or extracted table from the at least one section having figure class and/or table class respectively; and
    - (3) arranging one or more labelled text blocks, extracted figure and/or extracted table based on the labels, associations and the reading order; and
- (f) generating the parsed document from the digital document based on the structured content.

* * * * *